United States Patent
Morwing et al.

(10) Patent No.: US 7,313,277 B2
(45) Date of Patent: Dec. 25, 2007

(54) METHOD AND DEVICE FOR RECOGNITION OF A HANDWRITTEN PATTERN

(75) Inventors: Jonas Morwing, Lund (SE); Gunnar Sparr, Lund (SE)

(73) Assignee: Zi Decuma AB, Lund (SE)

( * ) Notice: Subject to any disclaimer, the term of this patent is extended or adjusted under 35 U.S.C. 154(b) by 654 days.

(21) Appl. No.: 10/469,950

(22) PCT Filed: Feb. 8, 2002

(86) PCT No.: PCT/SE02/00217

§ 371 (c)(1),
(2), (4) Date: Mar. 10, 2004

(87) PCT Pub. No.: WO02/071318

PCT Pub. Date: Sep. 12, 2002

(65) Prior Publication Data

US 2004/0136591 A1    Jul. 15, 2004

(30) Foreign Application Priority Data

Mar. 7, 2001   (SE)   ................................. 0100745

(51) Int. Cl.
   *G06K 9/18*   (2006.01)
(52) U.S. Cl. ............... 382/186; 382/177; 382/229
(58) Field of Classification Search ........ 382/186–189, 382/177, 185, 159, 174, 197, 229, 178; 283/67, 283/122, 187, 192; 215/123, 174; 705/12; 235/51

See application file for complete search history.

(56) References Cited

U.S. PATENT DOCUMENTS

| | | | |
|---|---|---|---|
| 5,313,527 A | | 5/1994 | Guberman et al. |
| 5,588,074 A | | 12/1996 | Sugiyama |
| 5,730,468 A | * | 3/1998 | Wirtz ........................ 283/70 |
| 6,018,591 A | * | 1/2000 | Hull et al. ................ 382/186 |
| 6,633,671 B2 | * | 10/2003 | Munich et al. ............ 382/187 |
| 2001/0016074 A1 | | 8/2001 | Hamamura |

* cited by examiner

*Primary Examiner*—Sheela Chawan
(74) *Attorney, Agent, or Firm*—Finnegan, Henderson, Farabow, Garrett & Dunner, LLP (57) ABSTRACT

A method for recognition of a handwritten pattern comprises the steps of forming (4) a representation of the handwritten pattern, forming (6) at least two sub-configurations by dividing the representation of the handwritten pattern, and processing the subconfigurations. The step of processing comprises the steps of comparing (8) each subconfiguration with reference configurations, selecting (10) at least one subconfiguration candidate for each subconfiguration among the reference configurations based on said step of comparing, and determining (12) at least one candidate pattern consisting of one selected subconfiguration candidate for each subconfiguration. The method further comprises the steps of comparing (14) the representation of the handwritten pattern to the candidate pattern, and computing (16) a cost function in order to find a closest matching candidate pattern. The cost function is based on the comparing of the representation of the handwritten pattern to the candidate pattern and on the comparing of the subconfigurations to the selected subconfiguration candidates in the candidate pattern.

12 Claims, 3 Drawing Sheets

METHOD AND DEVICE FOR RECOGNITION OF A HANDWRITTEN PATTERN

TECHNICAL FIELD

The present invention relates to a method and a device for recognition of a handwritten pattern.

BACKGROUND OF THE INVENTION

There is an increasing need for recognition of handwriting. Portable data handling devices, such as PDAs (Personal Digital Assistant), mobile phones and portable computers, are becoming increasingly popular. In order to enter data into these portable devices, a text insertion unit is needed.

Text insertion units have formerly been implemented as keyboards. This, however, sets limits to the minimum size of the portable device, and therefore a different way of inserting text into the device is needed in order to enable smaller devices.

In such devices, the keyboards can now be replaced by some kind of recognition of handwritten text. A common solution is to arrange a pressure-sensitive area where a user can write characters. The characters are then interpreted and handled by the portable device. It is, of course, also of interest to replace keyboards of regular stationary computers.

Thus, recognition of handwritten characters is an important task in portable and stationary devices. In recognition of a handwritten text, each character is often recognized individually. However, this implies that a lot of information, which could be useful for a correct. recognition, is disregarded. For example, the height of a character compared to other characters is useful when trying to distinguish between 'o' and 'O'. Also, some characters extend below or above other characters. This could be used for recognition of a 'P' compared to a 'p'.

There are some ways today of using the information given by characters that extend below or above other characters for better recognition of handwritten text. These methods try to define a base line and a core region to decide where the characters should be positioned. The base line is the line on which the text stands, but characters as g and p extend below it. The core region is the region over the base line, which all characters intersect. Characters, such as 'a' and 'm', are completely inside the core region, whereas 'l' and 'b' extend above the core region. However, it could be hard to find a base line for the text and it is hard to define the core region, especially if the characters are inclined. Furthermore, this method is specialized in Latin characters and could not be used in e.g. Chinese characters.

Another method is to have reference patterns for two or more characters combined and recognize each pattern as a whole. However, this implies that a very large number of reference patterns are needed and thus the recognition becomes slow.

SUMMARY OF THE INVENTION

The object of the invention is to provide an improved method for recognition of handwritten patterns. A special object of the invention is that the method should be able to distinguish between characters that only differ in size or position.

The objects of the invention are achieved by a method for recognition of a handwritten pattern, comprising the steps of forming a representation of the handwritten pattern, forming at least two subconfigurations by dividing the representation of the handwritten pattern, and processing the subconfigurations. The step of processing comprises the steps of comparing each subconfiguration with reference configurations, selecting at least one subconfiguration candidate for each subconfiguration among the reference configurations based on said step of comparing, and determining at least one candidate pattern consisting of one selected subconfiguration candidate for each subconfiguration. The method further comprises the steps of comparing the representation of the handwritten pattern to the candidate pattern, and computing a cost function in order to find a closest matching candidate pattern. The cost function is based on the comparing of the representation of the handwritten pattern to the candidate pattern and on the comparing of the subconfigurations to the selected subconfiguration candidates in the candidate pattern.

The inventive method recognizes a handwritten pattern by recognizing the subconfigurations that form the pattern and recognizing how these are combined. The comparison of the representation of the handwritten pattern to the candidate pattern is weighed into the cost function and could thus to the cost function add information of, the interrelations between the subconfigurations. As a result, the interrelations between the subconfigurations may be considered, without the need of finding a base line and a core region of the pattern.

Furthermore, the selected subconfiguration candidates can be used to form ordinary candidate patterns. The candidate patterns can then be formed from the reference configurations during the processing of the subconfigurations and, in this way, there is no need for an extensive database of candidate patterns.

In the context of this application the term pattern is defined as a word, a single character or a part of a character. If a character is complicated it could be recognized by recognition of the parts forming the character as well as the character itself. This reasoning also applies to a pattern being a part of a character. In the latter two cases it could be advantageous if the pattern is stored in the database. The term cost function is defined as a function which determines the goodness of a solution during the computational process.

The forming of subconfigurations will not necessarily use all parts of the handwritten pattern. For instance, for cursive handwriting, the handwritten pattern consists of characters and ligatures between the characters. The forming of subconfigurations could then aim at finding the characters and designate these as subconfigurations, whereupon the ligatures could be skipped. Alternatively, the information in the ligatures is used as well and these ligatures will then form additional subconfigurations.

The comparison of the handwritten pattern to the candidate pattern could be performed by comparing the patterns to each other as a whole. However, the patterns could also be compared by comparing sets of two or more subconfigurations of the handwritten pattern to sets of corresponding subconfiguration candidates in the candidate pattern, and repeating these comparisons for different sets until all subconfigurations have been included in at least one set of subconfigurations.

In a preferred embodiment, the step of determining a candidate pattern comprises the step of merging one selected subconfiguration candidate for each subconfiguration into a candidate pattern, said merging being made according to a predefined rule.

As a result, the determining of the candidate pattern is easily performed. The merging of the subconfiguration candidates into a candidate pattern is fast, since a predefined rule controls how the merging is to be done.

Preferably, the step of comparing the representation of the handwritten pattern to the candidate pattern comprises the step of measuring a difference of the positioning of the subconfigurations relative to each other in the handwritten pattern compared to the positioning of the selected subconfiguration candidates relative to each other in the candidate pattern. The determined candidate pattern forms a template of how certain subconfigurations should be positioned relative to each other. The measuring of the difference of the positioning of the subconfigurations in the handwritten pattern to the positioning of the subconfiguration candidates in the candidate pattern will thus give a measure of how well the handwritten pattern follows the template.

In a preferred embodiment, the step of measuring the difference of the positioning comprises the steps of transforming the representation of the handwritten pattern to make it resemble the candidate pattern as much as possible and computing a geometric proximity between the representation of the handwritten pattern and the transformed representation of the handwritten pattern.

This means that the representation of the handwritten pattern is transformed and then compared to the original representation. Thus, there will be no problem if the representation of the handwritten pattern and the candidate pattern have different sets of representations, such as one representation comprising more points than the other.

In the context of this application the term geometric proximity is defined as a measure of the likeness of the shape of two patterns. The shapes are invariant with respect to a group of transformations of the shapes, i.e. the representation of the shapes is not altered by the group of transformations. This group of transformations could be similarity transformations, thus including scaling, rotation, and translation of the pattern, or affine transformations, further including skewing of the pattern. Thus, the geometric proximity gives the same result of the likeness of the shape of the two patterns, regardless if one of the patterns has been transformed by a transformation belonging to the transformation group in question.

In another embodiment, the step of measuring the difference of the positioning comprises the steps of transforming the candidate pattern to make it resemble the representation of the handwritten pattern as much as possible and computing a geometric proximity between the candidate pattern and the transformed candidate pattern.

In this way, instead the candidate pattern is transformed to resemble the representation of the handwritten pattern. The candidate pattern is formed by the reference configurations, which are represented in a form that could easily be transformed.

In yet another embodiment, the step of measuring the difference of the positioning comprises computing a geometric proximity between the representation of the handwritten pattern and the candidate pattern. This means that the measuring of the difference is performed directly between the handwritten pattern and the candidate pattern and no step of transformation has to be performed first.

Preferably, the step of forming at least two subconfigurations by dividing the representation of the handwritten pattern comprises the step of forming different sets of subconfigurations by dividing the representation of the handwritten pattern in alternative ways. This is especially useful when trying to recognize cursive writing. The subconfigurations are then not unambiguously separated. In many cases, several different splittings of the pattern are possible. Therefore, the handwritten pattern is divided in alternative ways into different sets of subconfigurations in order to be certain that the correct set is obtained.

Preferably, the step of processing the subconfigurations is performed for each set of subconfigurations. In this way, measures are acquired for the resemblances between each set of subconfigurations and the reference configurations. Thus, the correct set of subconfigurations is determined during the comparisons.

Preferably, the recognition of the handwritten pattern is independent of a group of transformations. The group of transformations could be e.g. similarity transformations or affine transformations. Thus, the handwritten pattern could be written in any size, inclination, etc.

The objects of the invention could also be achieved by a device for recognition of a handwritten character, comprising means for detecting the handwritten pattern and forming a representation of the handwritten pattern, and means for forming at least two subconfigurations by dividing the representation of-the handwritten pattern. The device further comprises a database, in which reference configurations are stored, means for comparing each subconfiguration with the reference configurations, and means for selecting, for each subconfiguration, at least one aubconfiguration candidate from the reference configurations in the database based on said comparing. The device further comprises means for determining at least one candidate pattern consisting of one selected subconfiguration candidate for each subconfiguration, means for comparing the representation of the handwritten pattern with the candidate pattern, and means for computing a cost function in order to find a closest matching candidate pattern. The cost function is based on the comparing of the representation of the handwritten pattern with the candidate pattern and on the comparing of the subconfigurations to the selected subconfiguration candidates in the candidate pattern.

The device according to the invention comprises means for comparing subconfigurations with reference configurations as well as means for comparing the representation of the handwritten pattern with the candidate pattern. This means that both information of the appearance of subconfigurations and information of interrelations between subconfigurations could be used, which gives a good possibility of correctly recognizing handwritten patterns. Only the building blocks of the handwritten patterns need to be stored in the database, since the means for determining a candidate pattern could generate patterns from the blocks. These blocks could then be retrieved quickly, as the database can be small.

BRIEF DESCRIPTION OF THE DRAWINGS

The present invention will now be described in more detail by way of example referring to the appended drawings.

DETAILED DESCRIPTION OF A PREFERRED EMBODIMENT OF THE INVENTION

Figure 1:
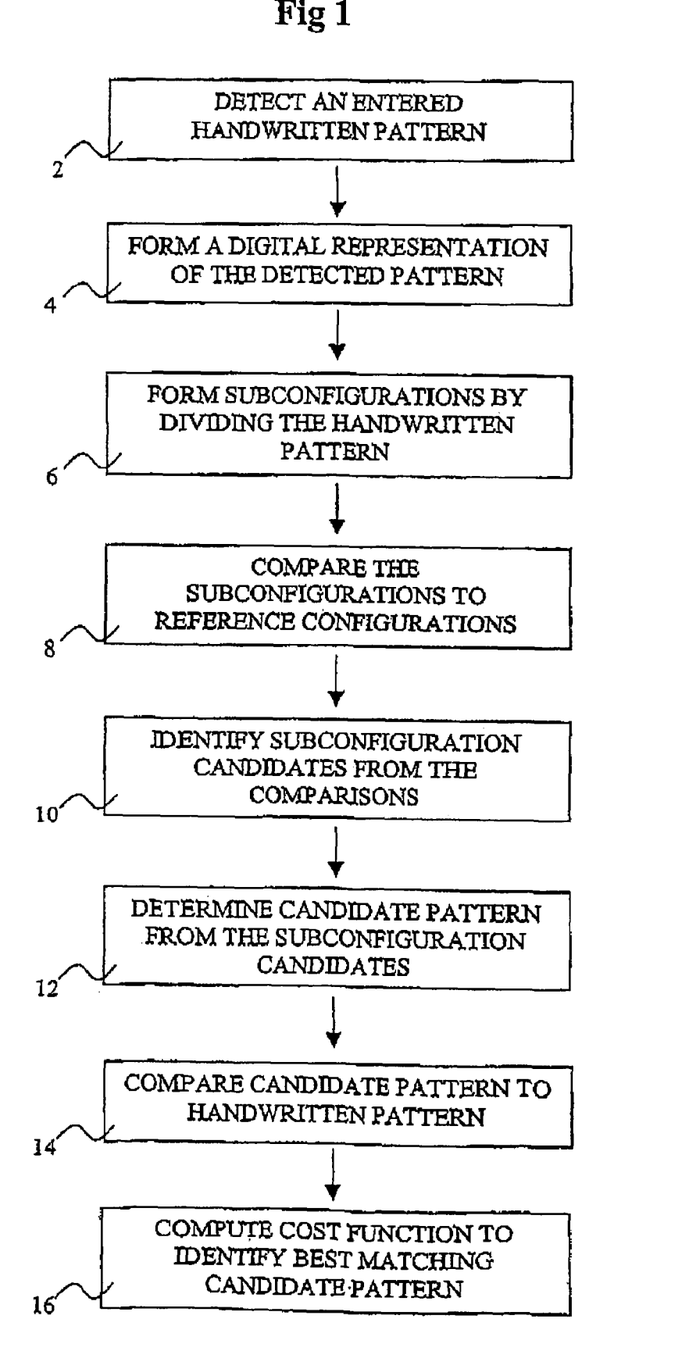
FIG. 1 is a flowchart of a method for recognition of a handwritten pattern according to the invention.
Figure 2A:
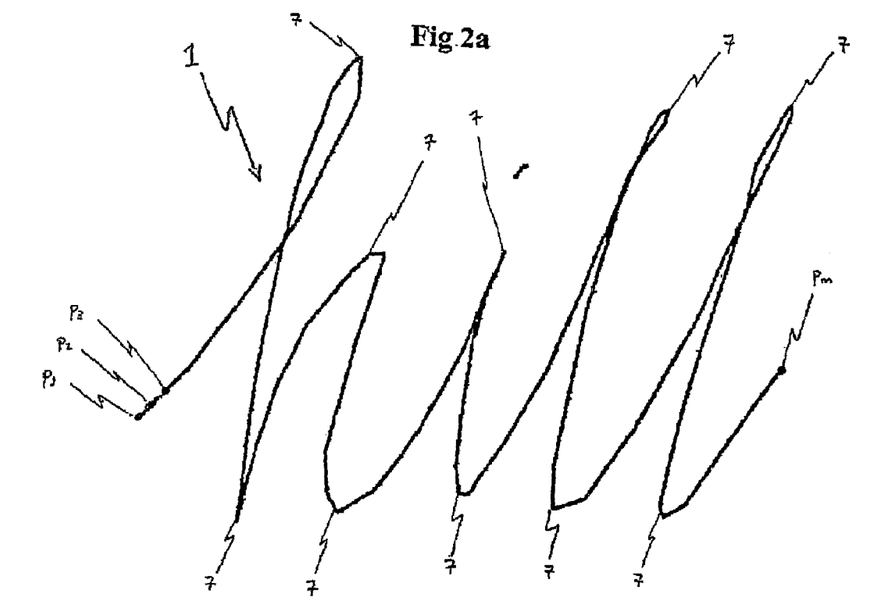
FIG. 2a is a view of an example of a handwritten pattern.
Figure 2B:
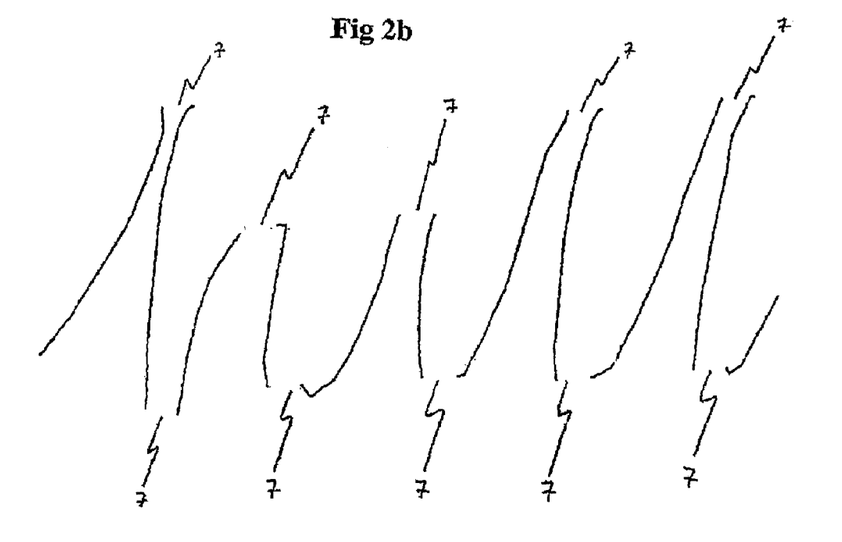
FIG. 2b is a view of an example of a dividing of the handwritten pattern in FIG. 2a in break points, in which the parts of the pattern have been horizontally translated to emphasize the break points.

Referring to FIGS. 1, 2a and 2b, a method for recognition of a handwritten pattern 1 will now be described in detail. First, a user enters a handwritten pattern 1 on a pressure-sensitive screen. The entered handwritten pattern 1 is detected, step 2, and a digital representation of the handwritten pattern 1 is formed, step 4. This representation comprises the positions of several points on the handwritten pattern 1. It could alternatively comprise vectors or curves describing the directions of the strokes of the handwritten pattern 1.

In a presently preferred embodiment, the detection returns a representation of the handwritten pattern 1 as a sequence of points $X=(p_1, p_2, \ldots, p_m)$, where $p_i=(x_i, y_i)$ for $i=1, 2, \ldots, m$. $(x_i, y_i)$ are the coordinates of the point $p_i$. The sequence of points is obtained by sequential detection of the position of a pen, with which the handwritten pattern 1 is written. It is desired that the representation of the handwritten pattern 1 is invariant with respect to e.g. similarity transformations. A representation that remains the same even though the pattern is affected by a transformation belonging to some group is said to be an invariant with respect to this group. Rotations, scalings and translations generate similarity transformations. In another embodiment the representation is invariant with respect to affine transformations, where skewing is also included.

An affine shape $s(X)$ is created from the point configuration $X=(p_1, p_2, \ldots, p_m)$. The affine shape is an invariant with respect to affine transformations. The affine shape $s(X)$ is the set of coefficients $\xi=(\xi_1, \xi_2, \ldots, \xi_m)$ that appear in affine null-combinations:

$$s(X) = \left\{ \xi \left| \sum_{k=1}^{m} \xi_k p_k = 0, \text{ with } \sum_{k=1}^{m} \xi_k = 0 \right. \right\}$$

The affine shape could also be represented by a matrix $S_x$ whose column space equals $s(X)$.

Next, at least two subconfigurations are formed by dividing the representation of the handwritten pattern, step 6. There are varying difficulties of correctly forming the subconfigurations. If the handwritten pattern 1 is cursive the forming of subconfigurations is very difficult and could be performed in different ways, but if the characters of the handwritten pattern 1 are not connected the forming of subconfigurations is fairly easy. The forming of subconfigurations implies that the representation of the handwritten pattern 1 is divided into sequential point configurations X. The representation of the handwritten pattern 1 is thus divided in certain break points 7, where the points on different sides of the break points 7 are assigned to different point configurations. The break points 7 are relatively easy to find when the handwritten pattern 1 is not cursive. Then a stroke, that is a line drawn without lifting the pen, relates only to one character. However, one character could comprise one or more strokes, and so identification must be done if two subsequent strokes belong to different characters or to the same character. If the handwritten pattern 1 is cursive the break points 7 will have to be found within strokes. This is much more difficult and could be accomplished in several different ways.

In this embodiment, the break points 7 are found by attempts to recognize ligatures, that is parts of the stroke that binds together two characters. This method uses the assumption that ligatures extend from left to right and also extend in positive vertical direction. This is true for almost all ligatures. However, following an "o" or a "v", the ligature often extends straight to the right or even slightly downwards. The break points 7 are placed around each part of the stroke that extends to the right and in positive vertical direction. A break point 7 could then be placed within a character comprising a part extending like a ligature and consequently sets of subconfigurations forming the handwritten pattern 1 have to be created in different ways. The most easily obtained set is created by considering each stroke part extending to the right and in positive vertical direction as a ligature and thus considering each part between the ligatures as a subconfiguration. Other sets are obtained by considering some parts extending to the right and in positive verticals direction as parts of a character and thus merging stroke parts into one subconfiguration. Several sets are generated in this way and then used for the recognition of the handwritten pattern 1.

The above-described method for forming the subconfigurations requires that the text be entered horizontally for the ligatures to be correctly detected. However, if that is not the case, an orientation for the text has to be found and then the handwritten pattern 1 could be rotated or the defined direction of the ligatures could be set in accordance with the orientation of the text.

Subsequently, the subconfigurations that have been established by the segmentation are recognized. This is done by comparing the subconfigurations to reference configurations that have been stored in a database, step 8. The comparing of the subconfiguration 6 to a reference configuration gives a measure of how good the resemblance between the configurations is. The reference configurations that have good resemblances to the subconfigurations are kept and identified as subconfiguration candidates, step 10. One subconfiguration could thus be recognized by several reference configurations and the further processing of the subconfigurations will give the answer to which of these reference configurations is the correct interpretation of the subconfiguration. The individual comparisons of the subconfigurations to the reference configurations use the proximity measure outlined in WO 00/13131 by Sparr, G. and Berthilsson, R. The proximity measure is defined as $$\mu(X,Y) = P(S_1, S_2) = \|(I-P_{S_1})P_{S_2}\|^2 \qquad (1)$$

where $S_1$, $S_2$ are the affine shape matrices of the two point configurations X, which is a subconfiguration of the handwritten pattern, and Y, which is a reference configuration, and $P_{S_1}$, $P_{S_2}$ are the projection matrices for the space spanned by the columns of $S_1$ and $S_2$, respectively. $S_1$ and $S_2$ could be replaced in (1) by $X=(X\ 1)$ and $Y=(Y\ 1)$, respectively, with the same result, i.e. $p(S_1, S_2)=P(X,Y)$, since $S_1$ and $S_2$ are orthogonal to X and Y, respectively. This proximity measure returns a low value if the point configurations are very similar. Thus, if the proximity measure returns a value below a threshold value the reference configuration is assigned as a subconfiguration candidate for the present subconfiguration.

Next, candidate patterns are determined on the basis of the kept reference configurations, step 12. Some candidate patterns could be stored in the database, but the majority of candidate patterns are created by merging of the subconfiguration candidates. Examples of candidate patterns that could be stored in the database are characters consisting of more than one stroke, such as an "i", a "j" or a "t". Very common words could also be stored as candidate patterns.

Candidate patterns are determined for all sets of subconfigurations and for each set several candidate patterns could be determined. This occurs when a subconfiguration is not unambiguously interpreted as one reference configuration. All possible combinations of the candidate subconfigurations to the subconfigurations of the handwritten pattern 1 form their own candidate pattern. In this context the sequence of the subconfiguration candidates is kept the same as the sequence of the subconfigurations of the handwritten pattern 1. The merging of subconfiguration candidates is performed according to a predefined rule. This rule is determined according to how characters normally are placed with respect to each other. Thus, a subconfiguration candidate is placed a certain distance to the right of a preceding subconfiguration candidate. The vertical placement of the subconfiguration candidate is fixed so that the candidates stand on the same base line.

When all candidate patterns have been determined, the representation of the handwritten pattern 1 is compared to each candidate pattern, step 14. This comparison gives a measure of the resemblance of the whole handwritten pattern 1 to the candidate pattern. Thus, the candidate pattern that has the best individual resemblance of each subconfiguration together with the resemblance of the whole pattern is determined.

The measure of the resemblance of a handwritten pattern 1 to a candidate pattern is obtained by a relative proximity measure. In a preferred embodiment, the subconfiguration candidates are compared in pairs of adjacent subconfiguration candidates to the subconfigurations of the handwritten pattern 1, independently of the other subconfigurations in the patterns. All pairs in a candidate pattern are then compared to the corresponding pairs of subconfigurations in the handwritten pattern 1. A subconfiguration candidate is then paired with the subconfiguration candidate preceding it and in another pair with the subconfiguration following it. However, more subconfigurations could be compared at a time. This would then result in the fact that the importance of a single character diminishes and a greater risk of misinterpretation occurs. On the other hand, comparison of more subconfigurations at a time implies that more information of the interrelationships of the characters is used.

A relative shape $s(X_1, X_2)$ describes how the two point configurations $X_1$ and $X_2$, which each represent a subconfiguration of the handwritten pattern, should be put together. The relative shape $s(X_1, X_2)$ is a linear subspace of $s(X_1 \circ X_2)$ with the property $s(X_1 \circ X_2) = s(X_1) \oplus s(X_2) \oplus s(X_1, X_2)$. The relative proximity measure gives a measure of how well a relative shape of two point configurations $s(X_1, X_2)$ agrees with a relative shape of two other point configurations $s(Y_1, Y_2)$, where $Y_1$ and $Y_2$ represent selected subconfiguration candidates, forming a template for how the point configurations should be positioned to each other. In order to find the relative proximity measure we need to form $s(\chi) = s(X_1) \oplus s(X_2) \oplus s(Y_1, Y_2)$. This represents a compound configuration $\chi$ where the two configurations $X_1$ and $X_2$ are separately affinely transformed to form the relative shape $s(Y_1, Y_2)$. Then a proximity measure calculated for the two combined configurations $\chi$ and $X_o = X_1 \circ X_2$ gives a measure of how much the original compound configuration $X_o$ agrees with the configuration transformed to have the relative shape from the template $s(Y_1, Y_2)$. Thus, we need to find the transformation of $X_o$ that gives the best approximation of $Y_o = Y_1 \circ Y_2$ with the restriction that the individual affine shapes of $X_1$ and $X_2$ shall remain constant under the transformation. The transformed version of $X_o$ is called $\chi$. The relative proximity measure could then be achieved by comparing $X_o$ and $\chi$.

This could be done by forming a new matrix $X_{12}$, $$X_{12} = \begin{pmatrix} X_1 & 0 \\ 0 & X_2 \end{pmatrix} = \begin{pmatrix} X_1 & 1 & 0 & 0 \\ 0 & 0 & X_2 & 1 \end{pmatrix},$$

where 1 means a column of ones and 0 means one or more columns of zeroes, depending on the context. Then this matrix is made orthogonal, $$X_{12\perp} = \text{orth}(X_{12}).$$

$X_o = (X_o\ 1)$ is then a linear combination of these columns.

$$X_o = X_{12\perp} * A$$

Another linear combination, $\chi$, of the columns $X_{12\perp}$, will give us a solution to our problem, i.e. the composition of the two parts $X_1$ and $X_2$ that best approximates $Y_o$. To find this linear combination we want to minimize the norm $$\|\chi - Y_o\|_f = \|X_{12\perp} * B - Y_o\|_f,$$

where $Y_o = (Y_o\ 1)$. The B that minimizes this norm could be found from normal equations $$X_{12\perp}{}^T X_{12\perp} B = X_{12\perp}{}^T Y_o \Leftrightarrow$$

$$B = X_{12\perp}{}^T Y_o$$

Then we compare $\chi$ to $X_o$ with the proximity measure defined above, $(X_o, \chi)$. This will be referred to as the relative proximity measure.

An observation that is useful when this is to be implemented is that $$P(X_o, \chi) = P(X_{12\perp}{}^T A, X_{12\perp}{}^T B) = P(A, B)$$

Thus all computations that have to be done to calculate the relative proximity measure are to orthogonalize $X_{12}$ to $X_{12\perp}$, to calculate $A = X_{12\perp}{}^T X_o$, to calculate $B = X_{12\perp}{}^T Y_o$ and to compare A and B, i.e. to calculate $P(A, B)$.

Each candidate pattern now has a proximity measure for each of its individual subconfiguration candidates and a relative proximity measure for the entire candidate pattern. These measures should be weighed in a suitable way to correctly interpret the handwritten pattern 1. Thus, a cost function is designed to give the lowest cost to the best candidate pattern. Then the cost function is computed, step 16, to identify the best matching candidate pattern, which will be the result of the recognition. The cost function does not merely sum the proximity measures of the candidate patterns, but these are weighed in accordance with how complex the candidate is. The final cost function is thus a function of the weighed proximity measures. A simple suggestion is just to add all weighed proximity measures. Another maybe better approach is to add all factors and divide by the number of factors to get some kind of "cost per factor". Otherwise segmentations with fewer subconfigurations can get an improper advantage. According to the presently preferred embodiment the cost function is the sum $$\text{cost}(S_i) = \frac{\sum_{j=1}^{m_i} \Gamma(g_j^{(i)}, c_j^{(i)})}{m_i} + \frac{\sum_{j=1}^{m_i} \mu_r(g_j^{(i)}, g_{j+1}^{(i)}, c_j^{(i)}, c_{j+1}^{(i)})}{m_i - 1}$$

where $S_1, S_2, \ldots, S_n$, $S_i=(C_i,G_i)$ are the sequences consisting of the subconfiguration candidates $C_i=(c_1^{(i)}, c_2^{(i)}, \ldots, c_{m_i}^{(i)})$ and the corresponding subconfigurations $G_i=(g_1^{(i)}, g_2^{(i)}, \ldots, g_{m_i}^{(i)})$ of the handwritten pattern 1, the sequence consists of $m_i$ subconfiguratons, the function $\Gamma(g_j^{(i)},c_j^{(i)})$ defined below gives a measure of how good candidate the subconfiguration candidate $c_j^{(i)}$ is for the subconfiguration $g_j^{(i)}$ independently of how complex the candidate is, and $\mu_r(g_j^{(i)},g_{j+1}^{(i)}, c_j^{(i)}, c_{j+1}^{(i)})$ gives the relative proximity measure of the pair $(g_j^{(i)}, g_{j+1}^{(i)})$ compared to the pair $(c_j^{(i)}, c_{+1}^{(i)})$. The $\Gamma$-function is used to include the fact that different subconfigurations/characters get different typical values of proximity when compared to their database equivalent. Thus, the $\Gamma$-function regards both the proximity measure $\mu(g, c)$ and what the proximity measure usually is for that candidate when it is considered the best candidate. The function could for instance be $$\Gamma(g, c) = \frac{\mu(g, c)}{\rho(c)}$$

where $\rho(c)$ is the mean proximity measure for the candidate, c, when it is considered the best one. However, in the presently preferred embodiment the following definition is used:

$$\Gamma(g, c) = \frac{\mu(g, c)}{\eta(g)^{0.3}}$$

where $\eta(g)$ is the number of segments from which the subconfiguration is built up. This promotes characters with more segments, and gives the possibility of comparing these characters with more simple characters on hopefully even terms.

This, cost function could be trimmed to suit the patterns that are sought to be interpreted and could thus be differently designed for different alphabets.

The candidate pattern that gets the lowest result of the cost function will be deemed as the interpretation of the handwritten pattern 1.

It is not certain that all points in one character are entered in sequence. Some points could be entered before a following character, while other points could be entered after that character. Examples of this are dots in an "i" or a "j", or the bars across a "t" or a "q". These features are called secondary strokes and are often written last in a word. The information in these secondary strokes could be very useful to correctly interpret characters and distinguish between for example an "m" and three successive "i"'s.

Therefore, if a character with a secondary stroke is suggested as a candidate for a subconfiguration, a check is done if a secondary stroke is present and in that case, if this secondary stroke is correctly placed compared to the primary stroke of the character. If there is no secondary stroke, or if it is misplaced, a punishment is added to the candidate as interpretation of the subconfiguration, but on the other hand if a secondary stroke is correctly placed, a bonus is added to the candidate as interpretation of the subconfiguration. A measure of the placement of the secondary stroke with respect to the primary stroke is obtained with the relative proximity measure described above. The relative shape, that is the character with a primary and a secondary stroke, is preferably stored in the database, as the way of merging a secondary stroke into a primary stroke does not follow a scheme that is equal to all characters.

Figure 3:
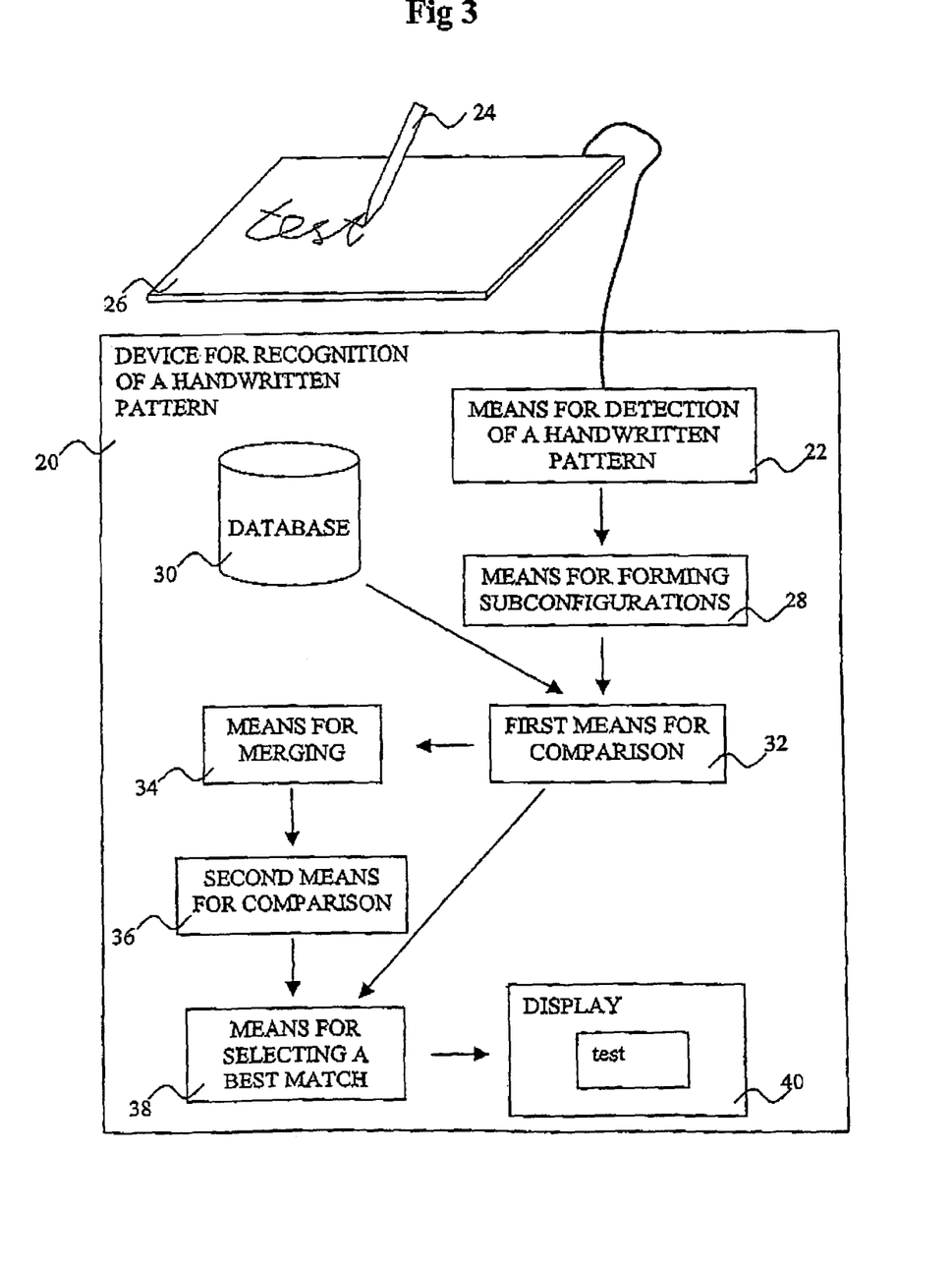
FIG. 3 is a schematic view of a device for recognition of a handwritten pattern according to the invention.

Referring to FIG. 3, a device 20 for recognition of a handwritten pattern according to the invention will be described. The device 20 for recognition of a handwritten pattern could be incorporated in a data handling device, such as a computer, a PDA, a mobile phone, a scanner or the like, which comprises a text input unit for entering text by manual writing. The device 20 for recognition of the handwritten pattern comprises means for detection 22 of a handwritten pattern entered on the text input unit. The means for detection 22 preferably repeatedly acquires the position of a pen 24 in a pressure-sensitive area 26, on which a user writes a pattern. The means for detection 22 generates a digital representation of the handwritten pattern. The device 20 for recognition of a handwritten pattern further comprises means for dividing 28 the representation of the handwritten pattern. The means for dividing 28 divides the handwritten pattern into subconfigurations. If the handwritten pattern cannot be unambiguously divided, the means for dividing 28 generates several sets of subconfigurations accounting for the different divisions of the handwritten pattern.

The device 20 for recognition of a handwritten pattern further comprises a database 30, in which reference configurations are stored. A first means for comparison 32 is arranged to compare the subconfigurations of the handwritten pattern to the reference configurations of the database 30 and generates a measure of the resemblances between the subconfigurations and the reference configurations. The first means for comparison 32 selects those reference configurations that have a measure of resemblance below a threshold as candidates for that subconfiguration. A means for merging 34 merges a candidate for each subconfiguration into a candidate pattern. For each set of subconfigurations all combinations of selected candidates for the subconfigurations are merged into candidate patterns. Thus, in most cases, several different candidate patterns are generated.

A second means for comparison 36 then compares the candidate patterns to the handwritten pattern to give a measure of the resemblances of the entire patterns to each other. A means for selecting a best match 38 weighs the measures of the resemblances of the individual subconfigurations and the whole patterns to find the candidate pattern that has the lowest cost. A display 40 then presents this candidate pattern, with typographical letters, as the recognition of the handwritten pattern.

Above, the description has been made essentially on the basis of the characters being written on a pressure-sensitive screen and being detected at the same time as they are written. However, the recognition method could also be applied to patterns that are detected, for instance scanned, after they have been written on a piece of paper. Thus, the detection comprises, instead of the operation of sensing the writing on the pressure-sensitive screen, the operation of reading (scanning) the characters from the piece of paper. Representations of the read handwritten pattern are thus detected and created and recognition could then be performed as described above.

It should be emphasized that the preferred embodiment described herein is in no way limiting and that many alternative embodiments are possible within the scope of protection defined by the appended claims. For example, the above embodiment has been described with reference to recognizing Latin characters and words. However, the invention could be applied to recognition of other alphabets or other symbols.

In an alternative embodiment the handwritten pattern could be a character or a part of a character. The division of the handwritten pattern will then be achieved in a different way. For example, if Chinese characters, are to be recognized the division could return each stroke as a subconfiguration.

The step of forming the subconfigurations could be performed in several different ways. For example, the break points 7 on each side of a subconfiguration could be identified by finding the maximum curvature points in the handwritten pattern. Another way of finding the break points 7 is to find local extrema in the vertical direction of the handwritten pattern. These and other ways of finding the break points 7 could also be combined, since the found break points 7 are not identical for these methods.

In an alternative embodiment, the two configurations $Y_1$ and $Y_2$ representing the selected subconfiguration candidates are affinely transformed for calculation of the relative proximity measure of how well the relative shape of two subconfigurations of the handwritten pattern $s(X_1, X_2)$ agrees with the relative shape $s(Y_1, Y_2)$. Thus, $s(\gamma)=s(Y_1) \oplus s(Y_2) \oplus s(X_1, X_2)$ is formed and a proximity measure for the two combined configurations $\gamma$ and $Y_o = Y_1 \circ Y_2$ is calculated in order to get the relative proximity measure.

In another alternative embodiment, the relative proximity measure is calculated directly between the combined configurations $X_o = X_1 \circ X_2$ and $Y_o = Y_1 \circ Y_2$.

The invention claimed is:

1. A method for recognition of a handwritten pattern, comprising:
   forming a representation of the handwritten pattern,
   forming at least two subconfigurations by dividing the representation of the handwritten pattern,
   processing the subconfigurations, said processing comprising:
      comparing each subconfiguration with reference configurations,
      selecting at least one subconfiguration candidate for each subconfiguration among the reference configurations based on said comparing of each subconfiguration, and
      determining at least one candidate pattern consisting of one selected subconfiguration candidate for each subconfiguration,
   comparing the representation of the handwritten pattern to the candidate pattern comprising measuring a difference of a positioning of the subconfigurations relative to each other compared to a positioning of the selected subconfiguration candidates relative to each other in the candidate pattern, and
   computing a cost function based on the comparing of the representation of the handwritten pattern to the candidate pattern and on the comparing of the subconfigurations to the selected subconfiguration candidates in the candidate pattern in order to find a closest matching candidate pattern.

2. The method according to claim 1, wherein determining a candidate pattern comprises merging one selected subconfiguration candidate for each subconfiguration to a candidate pattern, said merging being made according to a predefined rule.

3. The method according to claim 2, wherein measuring the difference of the positioning comprises:
   transforming the representation of the handwritten pattern to make it resemble the candidate pattern as much as possible, and
   computing a geometric proximity between the representation of the handwritten pattern and the transformed representation of the handwritten pattern.

4. The method according to claim 2, wherein measuring the difference of the positioning comprises:
   transforming the candidate pattern to make it resemble the representation of the handwritten pattern as much as possible, and
   computing a geometric proximity between the candidate pattern and the transformed candidate pattern.

5. The method according to claim 2, wherein measuring the difference of the positioning comprises computing a geometric proximity between the representation of the handwritten pattern and the candidate pattern.

6. The method according to claim 1, wherein measuring the difference of the positioning comprises:
   transforming the representation of the handwritten pattern to make it resemble the candidate pattern as much as possible, and
   computing a geometric proximity between the representation of the handwritten pattern and the transformed representation of the handwritten pattern.

7. The method according to claim 1, wherein measuring the difference of the positioning comprises:
   transforming the candidate pattern to make it resemble the representation of the handwritten pattern as much as possible, and
   computing a geometric proximity between the candidate pattern and the transformed candidate pattern.

8. The method according to claim 1, wherein measuring the difference of the positioning comprises computing a geometric proximity between the representation of the handwritten pattern and the candidate pattern.

9. The method according to any one of the preceding claims, wherein forming at least two subconfigurations by dividing the representation of the handwritten pattern comprises forming different sets of subconfigurations by dividing the representation of the handwritten pattern in alternative ways.

10. The method according to claim 9, wherein processing the subconfigurations is performed for each set of subconfigurations.

11. The method according to claim 1, wherein the recognition of the handwritten pattern is independent of a group of transformations.

12. A device for recognition of a handwritten character, comprising:
    means for detecting the handwritten pattern and forming a representation of the handwritten pattern,
    means for forming at least two subconfigurations by dividing the representation of the handwritten pattern,
    a database, in which reference configurations are stored,
    means for comparing each subconfiguration with the reference configurations,
    means for selecting, for each subconfiguration, at least one subconfiguration candidate from the reference configurations in the database based on said comparing of each subconfiguration,
    means for determining at least one candidate pattern consisting of one selected subconfiguration candidate for each subconfiguration,
    means for comparing the representation of the handwritten pattern with the candidate pattern, the comparing comprising measuring a difference of a positioning of the subconfigurations relative to each other compared to a positioning of the selected subconfiguration candidates relative to each other in the candidate pattern, and means for computing a cost function based on the comparing of the representation of the handwritten pattern with the candidate pattern and on the comparing of the subconfigurations to the selected subconfiguration candidates in the candidate pattern in order to find a closest matching candidate pattern.

* * * * *